April 17, 1951  E. L. OLIVER  2,548,999
CONTINUOUS INDUSTRIAL FILTER
Filed Nov. 7, 1947  2 Sheets-Sheet 1

INVENTOR.
EDWIN L. OLIVER
BY
HIS ATTORNEYS

April 17, 1951     E. L. OLIVER     2,548,999

CONTINUOUS INDUSTRIAL FILTER

Filed Nov. 7, 1947     2 Sheets-Sheet 2

INVENTOR.
EDWIN L. OLIVER
BY
HIS ATTORNEYS

Patented Apr. 17, 1951

2,548,999

UNITED STATES PATENT OFFICE 2,548,999

CONTINUOUS INDUSTRIAL FILTER

Edwin L. Oliver, Piedmont, Calif., assignor to Oliver United Filters Incorporated, Oakland, Calif., a corporation of Nevada Application November 7, 1947, Serial No. 784,632

3 Claims. (Cl. 210—202)

This invention relates in general to continuous industrial filters wherein a number of independent filter sections are made to pass successively through a body of liquid to be filtered while under the influence of an inwardly directed differential filtering pressure, and wherein the complete filtering cycle may include a washing cycle, a drying cycle and a cake discharge cycle, filters of this type being exemplified by a continuous rotary drum, continuous disc and continuous rotary table filters.

More particularly, this invention relates to and has for its object the provision of simple and effective means for accelerating the removal of filtrate from each of the independent filter sections during the complete cycle of operation, and which constitutes an improvement over the inventions described in the Hunter Patent No. 2,174,748, Duvall Patent No. 2,289,762 and Kiersted Patent No. Re. 22,646.

Although the various types of filters above referred to differ structurally, they have a common principle of construction and operation which can be briefly described with particular reference to the rotary drum type of filter.

A continuous rotary drum filter includes a drum formed on its periphery with a plurality of contiguous and independent filtrate compartments separated from each other by peripherally spaced longitudinally extending division strips. Disposed within each of these filtrate compartments is a drainage screen, and disposed over these screens and secured to the division strips is a suitable filter medium. Each of the filtrate compartments so formed communicates through a suitable pipe with an automatic valve associated with one or both of the drum trunnions, this valve or valves including a stationary valve body provided with interior arcuate valve ports arranged to communicate with one or more suitable sources of vacuum such as vacuum receivers, and in some instances with a source of reverse pressure. The filter drum so formed is arranged to pass through a body of liquid to be filtered which may be contained either in a filter tank within which the drum rotates, or which in case of top feed filters may be delivered to the upper periphery of the drum and formed into a pool thereon by means of a suitable dam. In either event, filtration proceeds under the influence of a vacuum controlled by the automatic filter valve, and which may be applied during the washing and drying cycles if the washing and drying cycles are resorted to. The cake formed on the filter medium during the pickup cycle is discharged after the washing and drying cycles by means of any one of a number of discharge mechanisms such as a scraper or doctor disposed across the face of the drum at the discharge station. In many instances the discharge of the cake from the filter is aided by a "blow back" or outwardly directed pressure controlled by means of the automatic valve.

In general, the cycle of operation of a rotary disc filter and of a table filter and sectionalized endless band filter is substantially in accordance with the cycle of operation above described.

Among other things, filters of these types are used for the filtration of pulps or slurries of a slimy nature, the solid contents of which when deposited on the filter medium operates to form an effective seal thereon, thereby preventing the passage of air therethrough. When this occurs, each filter section and its associated piping forms a closed system from which the filtrate cannot be removed effectively. In many instances this condition is highly objectionable, for any filtrate remaining in the system when the cake is being discharged from the filter will flow back into the cake, thereby resulting in a wet cake. This in turn is objectionable, for again in many instances it is desired to produce a cake as free from filtrate as is possible. The reason for this is that in some cases the filtrate is of value, and any filtrate remaining in the cake represents a decided loss. In other cases, as dry a cake as is possible is desired so as to minimize the cost of any additional drying which may be required. Furthermore, it is sometimes desired to effect a separation between the cloudy filtrate resulting from the initial stages of filtration and the clear filtrate resulting from filtration after an initial deposit of solids has been picked up on the filter medium. In other cases it may be desired to effect a separation between the filtrate per se and the wash water.

In all these filters it is highly desirable to provide a filter wherein the filtrate contained in the filtrate compartments may be rapidly drained therefrom, and in the filters described in the three patents above referred to, this end has been accomplished by admitting air to each section at that particular point in the cycle of operation wherein it is desired to rapidly remove the filtrate from filter sections. In each instance this has been done by admitting the required air to the sections through an automatic valve, the cycle of which is correlated to the cycle of operation of the filter.

More specifically the object of this invention is the provision in a continuous filter of means for permitting a small amount of air continuously to enter each of the filter sections during the complete cycle of operation of the filter.

The invention possesses other advantageous features, some of which, with the foregoing, will be set forth at length in the following description where those forms of the invention which have been selected for illustration in the drawings accompanying and forming a part of the present specification are outlined in full. In said drawings, two forms of the invention are shown, but it is to be understood that it is not limited to such forms, since the invention as set forth in the claims may be embodied in a plurality of forms.

Referring to the drawings.

Figure 1:
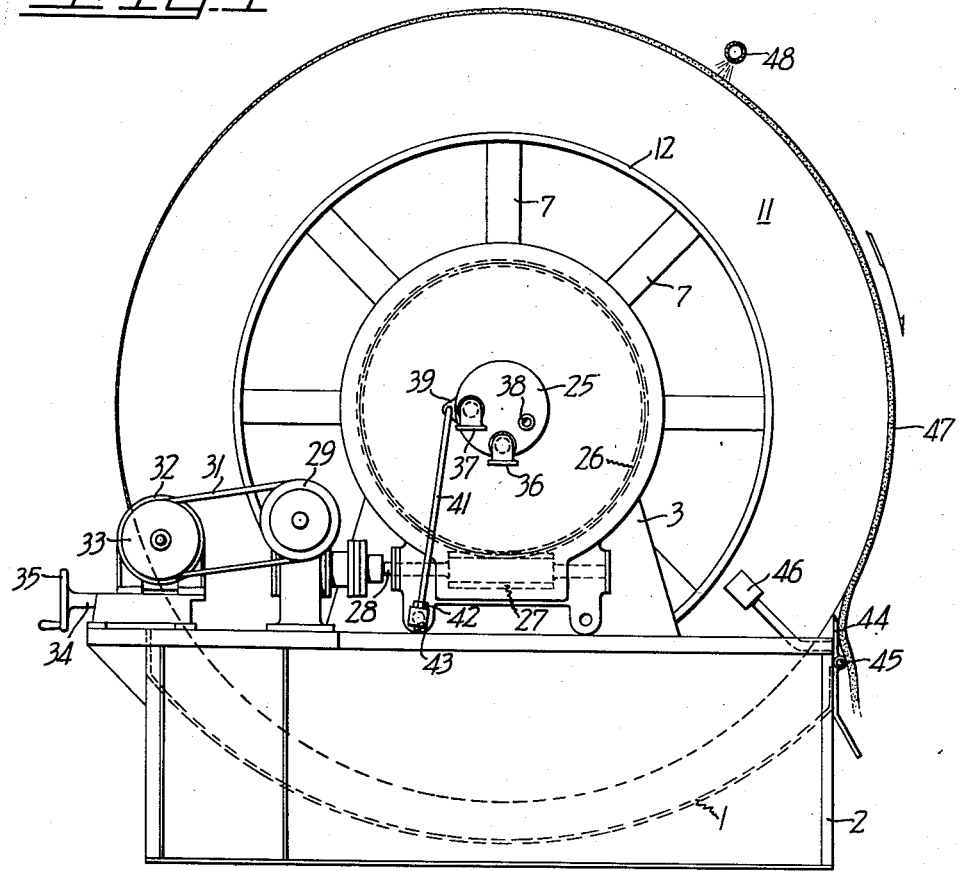
Fig. 1 is an elevation of the valve end of a continuous low submergence type of rotary drum filter embodying the objects of my invention.
Figure 2:
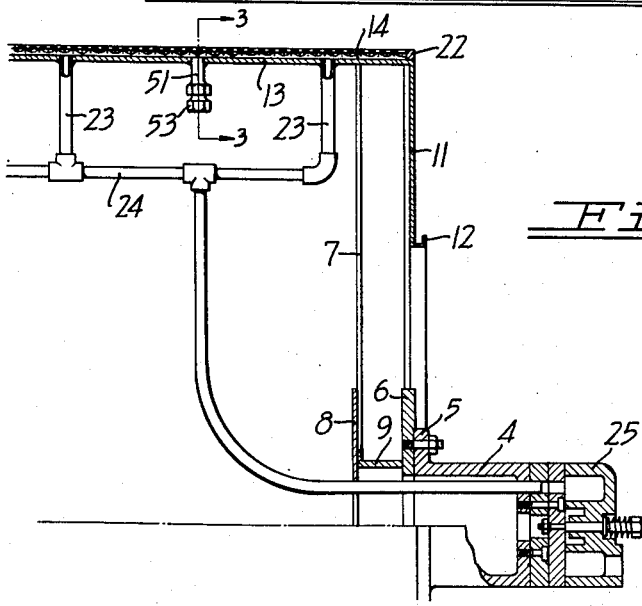
Fig. 2 is a partial longitudinal vertical section of the drum of the filter shown in Fig. 1.
Figure 3:
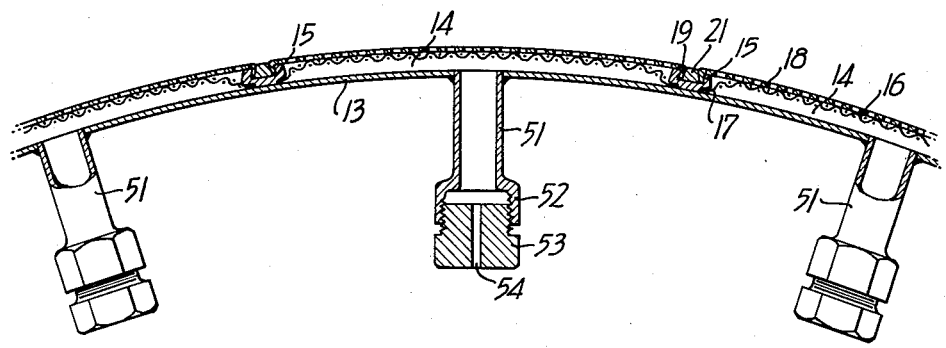
Fig. 3 is an enlarged detailed section taken on the line 3—3 of Fig. 2.

The filter shown in Figs. 1 to 3 inclusive includes a shallow arcuate tank 1 supported by a rectangular frame 2. Mounted on each end of the frame 2 is a pillow block 3 with which are associated suitable trunnion bearings of standard construction. Journaled on the bearings associated with the opposed pillow blocks 3 are opposed and axially aligned drum trunnions 4, each provided at its inner end with a flange 5. Bolted to each flange 5 is a hub 6, and welded to this hub is a spider consisting of a plurality of radially extending spokes 7 of channel construction. Welded to the inner side of this spider in an annular plate 8 coaxial with the drum trunnions 4, and welded to and between the hub 6 and the plate 8 and to the inner ends of the spokes 7 is a ring 9. Welded to the outer faces of each set of spokes 7 is an annular drum head 11 provided on its inner periphery with a flange 12. Fastened to or formed integral with the opposed drum heads 11 is a cylindrical drum 13, this drum, as shown in Fig. 3, being divided into a plurality of contiguous filtrate compartments 14 by peripherally spaced longitudinally extending division strips 15 welded to the outer surface thereof. Disposed within each of the filtrate compartments 14 is a drainage screen 16, having marginal edges 17 clamped beneath the overhanging edges of the division strips 15. Supported on the drainage screens 16 is a punched metal filter medium 18, having marginal edges disposed within dovetailed channels 19 formed in division strips and which are locked therein by suitable calking strips 21. Closing each end of the filtrate compartments 14 is a ring 22 sealed to the ends of the drum immediately above the drum heads 11.

Communicating with each of the filtrate compartments 14 are a number of longitudinally spaced radially extending nipples 23, these nipples being connected at their inner ends with manifolds 24 which in turn communicate with an automatic valve 25 associated with one of the filter trunnions 4 and by which each of the filter sections 14 can be successively subjected to a vacuum and a reverse pressure or blow back.

Mounted on the trunnion 4 with which the automatic valve 25 is associated is a ring gear 26 arranged to mesh with a worm 27. The worm 27 is carried by a shaft 28 driven by suitable drive mechanism including a pulley wheel 29, a belt 31 and a set of speed reducing pulleys 32 associated with a motor 33. The motor 33 is arranged to be moved transversely of the frame 2 by means of a screw 34 driven by a hand wheel 35 for the purpose of adjusting the relative position of the pulleys 32, all in accordance with well known practice. It will be seen that as a result of this construction the motor 33 is arranged to drive the filter drum 13 and its associated filter compartments 14 at any desired speed within the limit of the motor 33 and the speed reducer associated therewith.

The automatic filter valve 25, in accordance with standard construction, is provided with fittings 36 and 37 by which the valve may be connected with a pair of vacuum receivers or other source of sub-atmospheric pressure, and with a fitting 38 by which one of the ports of the automatic valve may be made to communicate with a source of super-atmospheric pressure. The stationary valve body of the automatic valve 25 is provided with a lug 39, and connected to this lug is a rod 41, the outer end of which passes through a nut 42 pivoted to a stationary portion 43 associated with the frame 2. By mean of the rod 41 the angular position of the valve body can be adjusted so as to shift the cycle of operation of the filter.

Mounted on the frame 2 adjacent the descending side of the drum and well beneath the center line thereof is a scraper or doctor 44 arranged to rotate about a pin 45 and to be urged in contact with the filter medium 18 by a counterweight 46.

The filter so far described is of standard construction. As each of the filtrate compartments 14 rotate through the pulp or slurry contained in the tank 1 it is subjected by means of the automatic valve 25 to the influence of a sub-atmospheric pressure so as to draw filtrate therethrough. During the initial stages of cake formation the resulting cloudy filtrate passes through the fitting 36 into the vacuum receiver associated therewith, and the subsequent clear filtrate through the initially formed cake and filter medium and passes through the fitting 37 to its associated vacuum receiver. If desired, the cake 47 carried on the filter medium may be subjected to a displacement wash by means of a series of sprays 48 disposed over the face of the drum. To aid in discharging the cake from the drum, each of the filter compartments 14 may be subjected to a reverse pressure as it approaches the doctor 44 by means of the fitting 38 which, as above stated, communicates with a source of super-atmospheric pressure. Since this cycle is standard procedure, it needs no further description.

Figure 4:
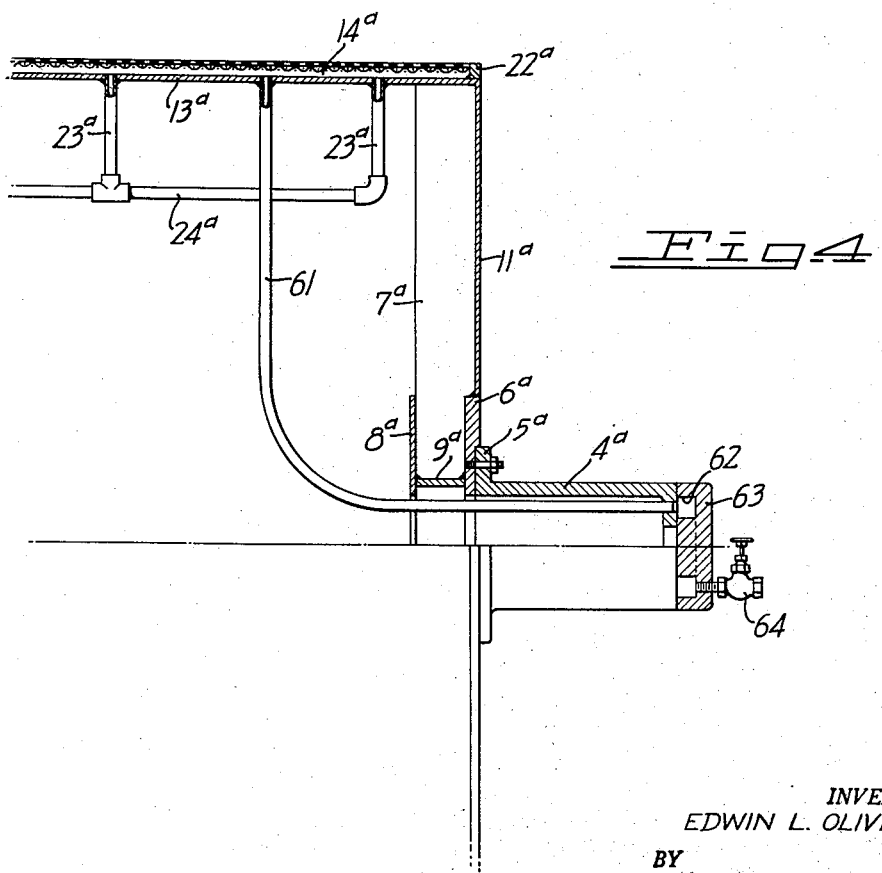
Fig. 4 is a partial longitudinal vertical section of a close ended drum of a high submergence type of rotary drum filter embodying the objects of my invention.

To aid in effectively clearing each of the filter sections 14 and its associated filtrate piping of all filtrate contained therein, I have provided each filter section with a nipple 51 extending into the drum and provided at its inner end with an enlarged internally threaded head 52. Screwed into the head 52 is a nut 53 formed with a small central opening 54. This construction therefore serves as a means for continuously introducing a small amount of air into each of the filter compartments 14 during each complete cycle of operation of the filter. The amount of air so entering each filter section depends upon the diameter of the opening 54, and can be readily adjusted by providing plugs having holes of varying sizes therein. The amount of air so continuously admitted into each filter section should be insufficient to appreciably vary the reading on the vacuum gauge normally associated with the vacuum system of a continuous filter, and should obviously be insufficient to totally break the vacuum in each section to such extent that the cake would not be held thereon during any portion of the cycle other than the discharge cycle. It is to be noted that this method of continuously admitting air into each of the sections is permissible for the reason that the slurry contained within the tank 1 is prevented by the drum heads 11 from entering the interior of the drum.

Where a high submergence type of filter is resorted to involving the use of a closed ended drum such as shown in Fig. 4, an alternative method of continuously partially breaking the vacuum is resorted to and includes a pipe 61 for establishing communication between each of the filter compartments 14a and a continuous annular port 62 formed in a stationary valve body 63 associated with the drum trunnion 4a opposed to the drum trunnion with which the usual automatic filter valve is associated. Connected to the valve body 63 is a hand operated valve 64 through which atmospheric air continuously passes into the annular port 62 into each of the pipes 61. Here again this construction serves as a means for continuously admitting a controlled quantity of atmospheric air to each of the filter compartments 14a during each complete cycle of operation of the filter. Except for this change, and except for the fact that each end of the drum 13a is closed by a drum head 11a, the construction of the filter drum illustrated in Fig. 4 is identical with that illustrated in Figs. 1, 2 and 3. Like the drum shown in these latter figures, each filter section 14a communicates through a set of nipples 23a and through a manifold 24a with an automatic filter valve of any suitable construction associated with the left end of the drum filter shown in Fig. 4.

From the above description it will be seen that I have provided a simple inexpensive means for supplying a controlled flow of air to each filter section of a continuous filter during the complete cycle of operation thereof, and which avoids the use for this purpose of automatic valves such as described in the Hunter, Duvall and Kiersted patents above referred to, and which serve to partially break the vacuum within each section only at one or more predetermined stages of the complete cycle of operation.

I claim:

1. A rotary drum filter including a filter drum divided into a plurality of contiguous and independent filter compartments, said drum being arranged to travel through a body of slurry to be filtered; and a conduit associated with each of said filter compartments, one end of said conduit communicating with the interior of each of its associated filter compartments and the other end of said conduit communicating with atmosphere through a restricted opening, said conduits and orifices serving continuously to admit a small quantity of air to their associated filter compartments during the complete cycle of operation of said filter.

2. A continuous filter including: a shallow filter tank; a filter drum mounted for rotation in said tank and provided on its periphery with a plurality of contiguous filtrate compartments; an automatic filter valve associated with said filter drum for successively subjecting each of said filtrate compartments to sub-atmospheric pressure; a nipple connected to the floor of each of said filtrate compartments and extending into said drum, said nipples serving continuously to establish communication between said filtrate compartments and the interior of said drum.

3. A continuous filter including: a plurality of independent filter compartments arranged to travel through a body of slurry to be filtered under the influence of a partial vacuum and a conduit connected to the interior of each of said compartments, each of said conduits being open to atmospheric pressure whereby a small quantity of air under atmospheric pressure is continuously admitted to each of said filter compartments during each complete cycle of operation of said filter.

EDWIN L. OLIVER.

REFERENCES CITED

The following references are of record in the file of this patent:

UNITED STATES PATENTS

| Number | Name | Date |
|---|---|---|
| Re. 22,646 | Kiersted | May 29, 1945 |
| 2,174,748 | Hunter | Oct. 3, 1939 |
| 2,289,762 | Duvall | July 14, 1942 |
| 2,321,230 | Mills et al | June 8, 1943 |
| 2,327,543 | Moor | Aug. 24, 1943 |